United States Patent [19]
Turner et al.

[11] Patent Number: 5,916,431
[45] Date of Patent: Jun. 29, 1999

[54] FILTER CLEANING

[75] Inventors: Andrew Derek Turner, Abingdon; Ronald Keith Dawson, Wantage, both of United Kingdom

[73] Assignee: AEA Technology plc, Didcot, United Kingdom

[21] Appl. No.: 08/351,893

[22] Filed: Nov. 10, 1994

Related U.S. Application Data

[63] Continuation of application No. 08/046,190, Apr. 6, 1993, abandoned, which is a continuation of application No. 07/742,383, Aug. 8, 1991, abandoned.

[30] Foreign Application Priority Data

Aug. 31, 1990 [GB] United Kingdom .................. 9019216

[51] Int. Cl.$^6$ .......................................... C25F 1/06
[52] U.S. Cl. .......................... 205/704; 205/705; 205/712; 205/741

[58] Field of Search .................. 204/140, 141.5, 204/145 R; 205/704, 705, 712, 741

[56] References Cited

U.S. PATENT DOCUMENTS 3,634,048  1/1972  Koons et al. .......................... 29/196.6
4,624,760  11/1986  Pottinger et al. .................... 204/141.5

*Primary Examiner*—Arun S. Phasge
*Attorney, Agent, or Firm*—William H. Holt; William R. Hinds

[57] ABSTRACT

During filtration, periodic application of a potential difference between an electrically conducting filter medium and counter electrode (as anode) generates a gaseous product at the filter and cleans the filter. To minimise corrosion the counter electrode is of low chromium stainless steel, for example 9% chromium.

8 Claims, No Drawings

FILTER CLEANING

This is a continuation of application Ser. No. 08/046,190 filed Apr. 6, 1993, now abandoned which is a continuation of application Ser. No. 07/742,383 filed Aug. 8, 1991, now abandoned.

This invention relates to the electrochemical cleaning electrically conducting filters.

Filtration is a widely used industrial process and the fouling of filters can be a considerable problem, especially in microfiltration and ultrafiltration. Such fouling tends to reduce filtrate fluxes, and the need for cleaning treatment increases the complexity of filtration equipment, involves loss of time, and may decrease filter membrane lifetime. Conventionally such cleaning treatment has involved chemical dissolution of foulant material, or backwashing.

An electrochemical cleaning process, applicable where the filter medium is electrically conducting, is described in GB 2 160 545 B. In this process an electrochemical cell is established comprising the filter as a first electrode, a counter electrode, and with the process liquid as the electrolyte. At intervals during the filtration process a potential difference is applied between the first electrode and the counter electrode so as to generate at the filter a gaseous product, which may be in the form of microbubbles, and which cleans the filter. For example, a current of 50–300 mA/cm$^2$ of membrane might be applied for 1–5 seconds periodically between 4–15 times/hour. This process is applicable for example where the filters are metallic microporous membranes such as those of stainless steel mesh or sintered stainless steel, microporous graphite membranes, or microfiltration and ultrafiltration membranes of conducting ceramics such as doped titania or zirconia.

It will be appreciated that in this electrochemical cleaning process the counter electrode is continuously exposed to the process liquid. During the cleaning operation the counter electrode would typically be made the anode (in order to minimize corrosion of the filter), while for most of the time it would not be connected to any electrical supply. If the counter electrode is not to need replacing at frequent intervals it must be of a material which is not significantly corroded in either of these electrical states. Hitherto platinised titanium has been found to be a suitable material, but is expensive.

According to the present invention there is provided a method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, and periodically applying a potential difference between the filter and the counter electrode so as to generate by electrolysis a gaseous product at the filter and so to clean the filter, wherein the counter electrode comprises a steel with a chromium component of between 5 and 15 percent by weight.

A preferred steel contains 9% chromium. Such a counter electrode is comparatively cheap, but can be expected to suffer little corrosion either when the potential difference is not applied, or when the counter electrode is an anode. A practical electrode of this material can be expected to lose less than 1 mm in thickness as a result of corrosion over a 25 year period of use.

By comparison it should be appreciated that ordinary stainless steel (containing 18% chromium), although non-reactive in the intervals between applications of the potential difference, tends to dissolve more rapidly when it is made an anode.

The invention also provides an apparatus for performing this cleaning process.

Experiments have been carried out using three different stainless steels (types 321, 304L and 316L) and two lower chromium steels (F1, and BJ10 from Kobe steel), to assess the rate of dissolution when an anode made of such a steel is subjected to a continuous flow of current. In each experiment two anodes of the same metal were arranged on opposite sides but spaced apart from a common cathode, the outward facing surfaces of both anodes being insulated, and all three electrodes were immersed in an electrolyte. The compositions of these steels is given in Table I.

TABLE I

| Element | Alloy Composition (wt. %) | | | | |
|---|---|---|---|---|---|
| | 321 | 304L | 316L | F1 | BJ10 |
| Cr | 17–19 | 17.5–19 | 16.5–18.5 | 12–13 | 8.6 |
| Ni | 9–12 | 9–12 | 11–14 | 0.49 | |
| Fe | 69 | 70 | 67 | 86–87 | 90.8 |
| Mo | | | 2.25–3 | | |
| C | <0.08 | <0.03 | 0.03 | 0.1 | |
| Si | 0.2–1 | 0.2–1 | 0.2–1 | 0.18 | |
| Mg | | | | 0.41 | |
| V | | | | | 0.03 |
| S | 0.03 | 0.03 | 0.03 | 0.005 | 0.02 |
| P | 0.045 | 0.045 | 0.045 | | 0.02 |
| Ti | <0.57 | | | | |
| Mn | 0.5–2 | 0.5–2 | 0.5–2 | | 0.5 |

The experiments were conducted at 21° C. in 0.1M NaNO$_3$ at pH 10 under d.c. conditions of 150 mA/cm$^2$ of exposed anode surface. After 30 hours, the mean weight losses, W, shown in Table II were measured. In every case, the anodes had a bright finish on removal from the electrolyte and were not fouled by any corrosion products. However, in those cases where significant dissolution had occurred, the test solutions had turned a dark opaque brown colour due to the precipitation of Fe(OH)$_3$. As can be seen, the lower chrome alloys corroded significantly less than the austenitic stainless steels—with the 9% Cr alloy being particularly impressive.

TABLE II

| Alloy: | 321 | 304L | 316L | F1 | BJ10 |
|---|---|---|---|---|---|
| W/g m$^{-2}$h$^{-1}$ | 26.4 | 36.2 | 23.2 | 3.0 | 1.2 |

It is believed that the main process causing surface dissolution is the oxidation of the Cr content in the alloy to soluble CrO$_3$. In alloys of $\geq 18\%$, the Cr forms a continuous interconnected network in the hydrous oxide passive film, and thus allows channels to be dissolved in it. In this way, sections of oxide film are undercut and dissolution is able to continue. At low Cr contents, however, the probability of this occurring is reduced, thus decreasing the rate of corrosion. When the applied potential is in the oxygen evolution region, this process is simply superimposed on the substrate corrosion.

Further experiments with the 9% chromium alloy have been performed to find how the rate of weight loss depends on current density, and on the nature of the current. With a continuous current, and for an electrolyte of 0.1M NaNO$_3$ of pH 5, the rate of weight loss increases with current density from about 0.5 g m$^{-2}$ h$^{-1}$ at 100 mA/cm$^2$ to about 2.0 g m$^{-2}$ h$^{-1}$ at 300 mA/cm$^2$. With an electrolyte of 0.1M NaNO$_3$ of pH 10 the experimental results showed more scatter, and increased from about 1 g m$^{-2}$ h$^{-1}$ at 100 mA/cm$^2$ to about 2.5 g m–2 h$^{-1}$ at 300 mA/cm$^2$. With the pH 10 electrolyte and with a pulsing current (on for 5s, off for 20s) at 150 mA/cm$^2$ the rate of weight loss was slightly higher than for the same steady current, possibly because the intervals between pulses were too short for surface passivation to occur, being about 2.1 g m–2 h$^{-1}$.

Taking the worst measured rate of weight loss of 2.8 g m$^{-2}$ h$^{-1}$ (observed at pH 10 and 300 mA/cm$^2$) and assuming a filter is cleaned four times an hour with a 5s pulse, the filter being operated for 200 days a year, then in an operating life of 25 years the anode experiences this current for a total time:

$$t=667 \text{ hours}$$

and so the expected weight loss would be:

$$m=1870 \text{ g/m}^2$$

which corresponds to a linear surface removal of:

$$x=0.24 \text{ mm}$$

This can be expected to have negligible effect on the operation of the filter unit.

The cleaning process of the invention can for example be applied to a filter formed by a sintered stainless-steel fibre membrane. Such a membrane with a pore size of about 3 microns and with an asymmetric structure (with coarser structure and larger pores up to about 10 microns on one surface than the other) can be used for microfiltration. It has been found that if this membrane is used with the coarser surface facing the liquid to-be filtered, so a fouling layer builds up on that surface, regular use of the electrical cleaning process of the invention enables the bulk of the fouling layer to be removed, and so enhances filtrate throughput. Surprisingly it has been found that under these circumstances the filter provides as good a rejection of fines as in ultrafiltration, that is to say it acts as if the pore size was less than 0.1 microns. This is due to the filtering action of the fouling layer which remains in the pores of the membrane despite the electrical cleaning. Thus ultrafiltration of the liquid can readily be achieved much more cheaply, and with greater filtrate throughput, than with a conventional ultrafiltration membrane.

For example where a liquid contained iron hydroxide and also colloidal plutonium oxide, the iron hydroxide built up a fouling layer which prevented passage of the plutonium oxide into the filtrate as effectively as an ultrafiltration membrane. The microfiltration membrane preferably has pore sizes no larger than about 10 microns, desirably no more than 5 microns, or it is difficult to build up a fouling layer. The membrane must be such that during the cleaning process the gas bubbles preferentially displace the outer parts of the fouling layer rather than passing through and emerging from the rear surface of the membrane, and the use of an asymmetric membrane as described above ensures that this occurs.

We claim:

1. A method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, and periodically applying a potential difference between the filter and the counter electrode so as to generate by electrolysis a gaseous product at the filter and so to clean the filter, wherein the counter electrode comprises steel with a chromium component of between 5 and 12 percent by weight.

2. A method as claimed in claim 1, wherein the chromium is 9 per cent by weight.

3. A method of performing ultrafiltration on a liquid, comprising filtering the liquid through a porous electrically-conducting microfiltration membrane with pores of between 0.1 and 10 microns, so a fouling layer builds up on the upstream surface of the membrane, and cleaning the membrane by the method as claimed in claim 2 at intervals so as to enhance the rate of filtration whilst maintaining the rejection by the membrane of fines of diameter less than 0.1 microns.

4. A method of performing ultrafiltration on a liquid, comprising filtering the liquid through a porous electrically-conducting microfiltration membrane with pores of between 0.1 and 10 microns, so a fouling layer builds up on the upstream surface of the membrane, and cleaning the membrane by the method as claimed in claim 1 at intervals so as to enhance the rate of filtration whilst maintaining the rejection by the membrane of fines of diameter less than 0.1 microns.

5. A method as claimed in claim 1 wherein the counter electrode comprises a nickel component of less than 1 percent by weight.

6. A filtration apparatus comprising a porous electrically conducting filter, means for supplying an aqueous process liquid to one side of said filter for subjecting said liquid to filtration, cleaning means comprising a counter electrode disposed in contact with said process liquid and arranged so that said filter, said process liquid and said counter electrode together constitute an electrochemical cell, power supply means for periodically and briefly applying a potential difference between said filter and said counter electrode for generating, by electrolysis, a gaseous product for cleaning said filter, wherein said counter electrode comprises steel with a chromium component of between 5 and 12 percent by weight.

7. Filtration apparatus as defined in claim 6, wherein the chromium is 9 percent by weight.

8. A filtration apparatus as defined in claim 6 wherein said counter electrode comprises a nickel component less than 1 percent by weight.

* * * * *